June 17, 1941.  T. F. PEARSON  2,245,813
SHEARING MECHANISM FOR USE WITH DEVICES FOR FEEDING
MOLTEN GLASS TO FORMING MACHINES
Filed July 14, 1938  3 Sheets-Sheet 3

Inventor.
Thomas Finney Pearson.
Cushman Darby Cushman.
Attorneys

Patented June 17, 1941

2,245,813

UNITED STATES PATENT OFFICE 2,245,813

SHEARING MECHANISM FOR USE WITH DEVICES FOR FEEDING MOLTEN GLASS TO FORMING MACHINES

Thomas Finney Pearson, Pontefract, England, assignor to Crown Cork & Seal Company, Inc., New York, N. Y., a corporation of New York Application July 14, 1938, Serial No. 219,282 In Great Britain July 22, 1937

11 Claims. (Cl. 49—14)

The present invention relates to shearing mechanism for use with devices for feeding molten glass to a forming machine, and has for its primary object the provision of simple yet efficient means for adjusting the position of the shearing blades relatively to each other and as a unit relatively to the exit orifice of a furnace forehearth for example, through which the glass to be sheared flows in its passage to a forming machine.

According to the present invention, the blades are reciprocable in opposite directions along a straight line under the control of a pneumatically operated piston, the cylinder of which is adjustable relatively to the furnace forehearth.

From another aspect of the present invention, a shearing operation in a linear movement as distinct from an arcuate movement of one or a pair of relatively displaceable shear blades is obtained whilst permitting of universal adjustment of the blades relatively to the exit orifice of the furnace forehearth.

In a preferred form of apparatus, the blades are also adjustable relatively to each other apart from their universal adjustment as a unit relatively to the said exit orifice.

Preferably the cylinder is mounted for vertical adjustment within a yoke which in turn is bodily displaceable horizontally towards and away from the exit orifice of the forehearth.

Again, if desired, the yoke may also be pivotally displaceable in a horizontal plane beneath the forehearth exit orifice, in which event the means for pivotally displacing the yoke may be common to the means for its longitudinal displacement. In particular, where two controls are provided for displacing the yoke in opposite directions about its pivot, said controls may be interlocked and operable in unison to displace the yoke bodily to and from the exit orifice.

The shear blades may be independently adjustably mounted on holders either or both of which may be adjustably supported on carriers displaceable by the piston rod. Preferably one blade holder carrier is displaceable in unison with the piston rod and the other displaceable in the reverse direction under the control of a lever of the first order, one end of which has a pin and slot connection with the piston rod, and the other end of which similarly has a pin and slot connection with an arm on which the second shear blade holder carrier is supported.

The invention is more particularly described with reference to the accompanying drawings which illustrate one form of construction of shearing mechanism by way of example and in which.

Figure 1:
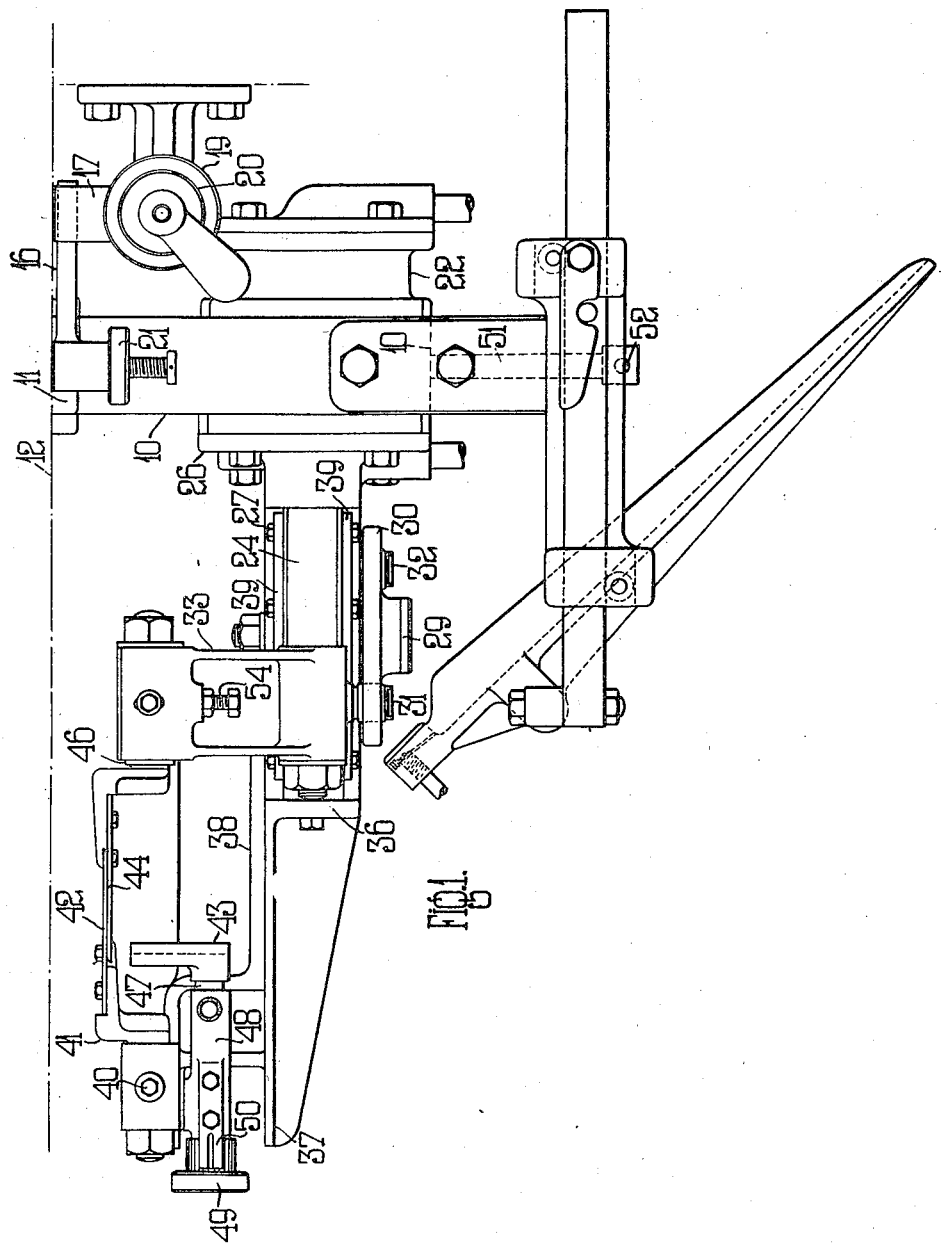
Figure 1 is a side elevation.

In the illustrated form of construction, a yoke 10 formed of a body part and flanges 11 at its upper end is connected to the frame 12 of a glass feeder such as a furnace forehearth by means of a clamping screw 13 which is adapted to pass through an elongated hole 14 in the upper part of the yoke. Each of the flanges 11 of the yoke 10 has curved recesses 15 in its side faces for the reception of bulbous ends 16a of bell crank levers 16, 16' the opposite ends of which are associated with internally threaded blocks 17, 17' for displacement longitudinally of a spindle 18. Block 17 is threaded on the threaded portion of a sleeve 19' surrounding and rotatably mounted upon the spindle 18, the sleeve being provided with a milled head 19. A similar head 20 is keyed or otherwise secured upon the projecting end of the spindle 18, whereby the spindle and the sleeve 19' may be rotated in unison or may be rotated in opposite directions by the appropriate manipulation of the heads 19, 20.

Figure 2:
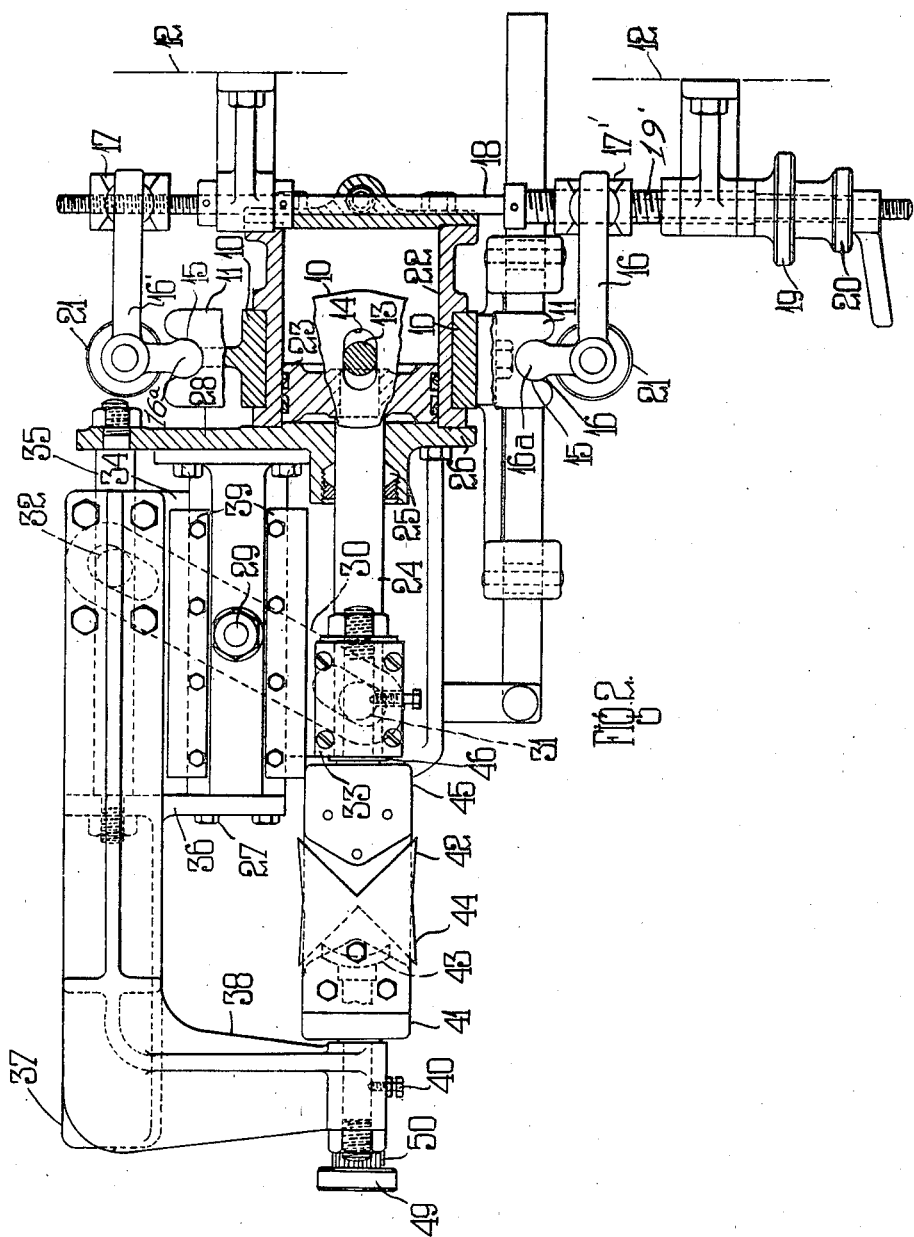
Figure 2 is a view partly in plan and partly in horizontal section.
Figure 3:
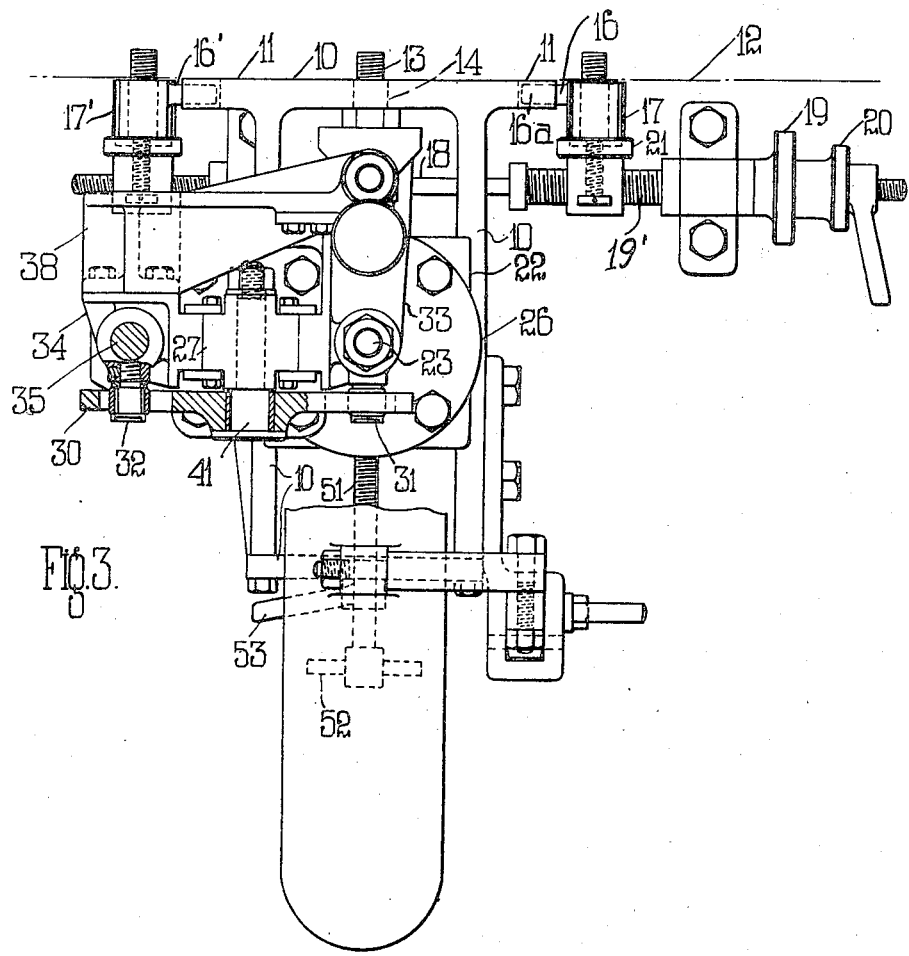
Figure 3 is a front elevation with certain parts shown in section.

As indicated in Figure 2, the threads on the sleeve 19 and the spindle are pitched in the same direction. Hence, if the spindle and sleeve are rotated in the same direction, the blocks 17, 17' will be displaced longitudinally along the axis of the spindle 18, thereby causing swinging movement of the bell cranks 16, 16' in the same direction. The short ends 16a of the bell cranks will, therefore, swing the yoke 10 about the axis of the supporting screw 13.

On the other hand, if the spindle 18 and the sleeve 19' are rotated relatively to each other in opposite directions, the blocks 17, 17' will move toward each other or away from each other along the spindle 18, depending upon the direction of rotation of the spindle and sleeve. Hence, the bell cranks 16, 16' will be pivoted in opposite directions and the ends 16a thereof will cause the yoke 10 to move along a longitudinal line, toward or away from the discharge orifice of the feeder, the extent of such bodily displacement being limited by the ends of the slots 14. If desired, a combined longitudinal and angular displacement may be imparted to the yoke 10 by rotating either the sleeve 19' or the spindle 18 more or less than the other, in the same or an opposite direction.

The bell cranks 16 may be vertically displaced relatively to the flanges 11 of the yoke 10 under the control of a screw 21 to detach the bulbous ends 16a from the yoke recesses, whereupon the yoke 10 may be swung about its pivot 13, which is parallel with the axis of the exit orifice of the forehearth, to bring the shearing mechanism wholly out of range of the feeder.

An air cylinder 22 for the pneumatic operation of the shear blades is adjustably supported within vertical side frame members of the body portion of the yoke 10, whilst a piston 23 is connected to a rod 24 which passes through a gland 25 on one end cover 26 of the cylinder.

The cylinder 22 may be raised or lowered relatively to the yoke 10 by means of a spindle 51 under the control of a rotatable handle 52 and a locking handle 53.

A guide arm 27 is also carried by an extension 28 of said cover 26 and has pivoted thereto at 29 a lever 30 of the first order, the opposite ends of which are slotted to receive pins 31, 32, one of which pins 31 is carried by a bracket 33 adjustably mounted on the piston rod 24 and the other pin 32 of which is carried by an arm 34 slideably mounted on a bar 35 carried by the cylinder cover extension 28.

The bar 35 is also supported by a bracket 36 secured to the opposite end of the guide arm 27 which is mounted on the front cover extension 28. The bracket 36 has an extension 37 which acts as a support for a blade arm 38, for one of the shear blades, the blade arm 38 being bolted or otherwise appropriately secured to the arm 34 slidably mounted on the rod 35 and deriving motion from the lever 30. The guide arm 27 is provided with upper and lower gib pieces 39 with which the bracket 33 and arm 34 respectively register and are longitudinally displaceable relatively thereto. It follows that the weight of the moving parts is supported by the gib pieces 39.

A pin 40 on the arm 38 is engaged by a keyway in the round shank of a blade holder 41 carrying a shear blade 42, said blade holder having a standard nut which on removal from the screwed end of the shank of the holder, enables the latter to be quickly withdrawn and replaced in a horizontal position. Mounted on the arm 38 is a doffer device 43 which provides for correction of any toss or tip which may be imparted to the gather by the opposite or opposed lower blade 44 carried by the bracket 33 after shearing. This doffer device 43 is also designed so that it may be adjusted whilst in operation, and includes a shank 47 having a threaded bore and carried by a supporting bracket 48, the threaded bore being engaged by the external thread of the shank of a control knob 49, which is retained in any desired position of rotary adjustment by a locking spring 50 in any well known manner.

The arm 38 mounted on the slide bar 35 is of such a length that it extends from that side of the exit orifice at which the yoke 10 is situated to the opposite side thereof and is bent in the form of a right angle with the holder 41 of the shear blade 42 carried at the end of the bridging arm so as to face the holder 45 of the other shear blade 44 but on the opposite side of the axis of the exit orifice of the feeder.

The shear blade holder 45 is adjustably supported in a carrier preferably in the form of a rectangular block 46 which is slidably mounted for vertical adjustment in the bracket 33 under the control of a lifting screw 54 and as a result of this it is possible to adjust the relationship of the horizontal or substantially horizontal planes of displacement of the shear blades to obtain the required tension to keep the blades together during the shearing operation.

It will be seen that the blades 42, 44 are relatively adjustable, and are also adjustable universally as a unit relatively to the forehearth orifice, whilst, in any position of adjustment and during their operation, on movement of the piston 23 in the direction towards the cover 26, the shear blade 44 is moved in synchronism with the piston whilst the opposite shear blade 42 by virtue of the lever connection 30 of its arm with the piston rod 24, is displaceable in the opposite direction to effect shearing of glass passing through the exit orifice of the feeder. Similarly, on displacement of the piston in a reverse direction the shear blades are separated. The motion of the shear blades at all times is in a straight line.

I declare that what I claim is:

1. A shearing mechanism for a glass feeder comprising an air cylinder, means for supporting the cylinder in a horizontal position below the floor of an associated forehearth, a horizontally projecting guide carried by the cylinder, a pair of shear blade supporting brackets slidably mounted on said guide, a lever of the first class fulcrumed on the guide and having its free ends operatively connected to said brackets, horizontally aligned, mutually facing shear blades carried by the brackets, a piston in said cylinder and a connection from said piston to one of said brackets, whereby reciprocating movements imparted thereto by the piston are translated to the other bracket in opposite directions by said lever.

2. A shearing mechanism for a glass feeder comprising substantially horizontal, parallel slideways, brackets slidably mounted thereon, a lever of the first class fulcrumed about a fixed axis having its ends connected to the brackets, whereby reciprocating motion imparted to one bracket reciprocates the other in the opposite direction, one of said brackets having a laterally displaced extension terminating in an end aligned with the other bracket, mutually facing, horizontally aligned shear blades carried by the brackets, and pneumatic means for imparting reciprocating movements to one of said brackets.

3. A shearing mechanism for a glass feeder comprising substantially horizontal, parallel slideways, brackets slidably mounted thereon, a horizontally disposed lever fulcrumed substantially at its center about a fixed, vertical axis and having its ends connected to the brackets, whereby reciprocating motion imparted to one bracket imparts substantially equal reciprocating motion to the other in the opposite direction, one of said brackets having a laterally displaced extension terminating in an end aligned with the other bracket, mutually facing, horizontally aligned shear blades carried by the brackets, and pneumatic means for imparting reciprocating movements to one of said brackets.

4. A shearing mechanism for a glass feeder comprising a vertically disposed yoke adapted to be supported at its upper end from the floor of a forehearth, a horizontally disposed cylinder carried by the yoke, means for adjusting the vertical position of the cylinder with respect to the yoke, a horizontal guide carried by the cylinder, shear blade supporting brackets slidably mounted on the guide, a lever of the first class fulcrumed on the guide and having its ends connected to the brackets, whereby the brackets are connected to reciprocate in opposite directions, mutually facing, horizontally aligned shear blades carried by the brackets, a piston in said cylinder and connections between said piston and one of said brackets.

5. A shearing mechanism for a glass feeder comprising a vertically disposed yoke, a support for the yoke carried by the floor of an associated forehearth and about which the yoke may pivot on a vertical axis, a laterally projecting shear assembly carried by the yoke, and means for pivoting the yoke and the shear assembly about said axis, said means comprising a lever pivoted about a fixed vertical axis and having an end engaging the yoke at a point offset from the axis of the support, and means for shifting the position of the other end of said lever.

6. A shearing mechanism for a glass feeder comprising a vertically disposed yoke, a support for the yoke carried by the floor of an associated forehearth and about which the yoke may pivot on a vertical axis, a laterally projecting shear assembly carried by the yoke, and means for pivoting the yoke and the shear assembly about said axis, said means comprising a pair of levers pivoted about spaced, fixed, vertical axes, one arm of each of said levers being in engagement with opposite sides of said yoke, and means for pivoting the levers in the same direction, to swing the yoke and the shear assembly about the vertical axis of the yoke.

7. A shearing mechanism for a glass feeder comprising a vertically disposed yoke, a support for the yoke carried by the floor of an associated forehearth and about which the yoke may pivot on a vertical axis, a laterally projecting shear assembly carried by the yoke, and means for pivoting the yoke and the shear assembly about said axis, said means comprising a pair of bell crank levers pivoted about spaced, fixed, vertical axes, said levers having arms disposed in engagement with opposite sides of the yoke and substantially parallel arms projecting rearwardly therefrom, threaded blocks carried by the latter arms, and threaded shaft means disposed in operative relation thereto, whereby the bell cranks may be pivoted in the same direction to swing the yoke about its vertical axis.

8. A shearing mechanism for a glass feeder comprising a vertically disposed yoke, a support for the yoke carried by the floor of an associated forehearth and upon which the yoke is relatively movable by pivoting action about a vertical axis and by substantially horizontal translational movement, a laterally projecting shear assembly carried by the yoke, and means for imparting the aforesaid movements to the yoke and the shear assembly, said means comprising a pair of levers connected to opposite sides of the yoke, means for swinging said levers in a common direction to impart pivoting movement to the yoke and for swinging the levers relatively to each other in opposite directions to impart translational movement to the yoke.

9. A shearing mechanism for a glass feeder comprising a vertically disposed yoke, a support for the yoke carried by the floor of an associated forehearth and upon which the yoke is relatively movable by pivoting action about a vertical axis and by substantially horizontal translational movement, a laterally projecting shear assembly carried by the yoke and means for imparting the aforesaid movements to the yoke and the shear assembly, said means comprising a pair of bell crank levers pivoted about spaced, fixed, vertical axes, each of said levers having an arm disposed in engagement with opposite sides of the yoke and a rearwardly projecting arm, and threaded shafts operatively connected to said last-named arms, whereby pivoting movement imparted by the shafts to the levers in a common direction swings the yoke and the shear assembly about the vertical axis of said support and pivoting movement imparted by the shafts to the levers in opposite directions relative to each other imparts translational movement to the yoke and the shear assembly.

10. A shearing mechanism for a glass feeder comprising a vertically disposed yoke, a support for the yoke carried by the floor of an associated forehearth and upon which the yoke is mounted for relative pivoting movement about a vertical axis and for substantially horizontal translational movement, a laterally projecting shear assembly carried by the yoke, means for adjusting the vertical position of the shear assembly with respect to the yoke and the yoke support, the last-mentioned means comprising a vertically disposed threaded rod connected respectively to the yoke and the shear assembly, and means for imparting pivoting and translational movements to the yoke and the shear assembly, said means comprising a pair of levers pivoted about fixed, vertical axes and having their ends in engagement with opposite sides of the yoke, and means for pivoting the levers in a common direction and in opposite directions, to impart pivoting movement to the yoke and to impart translational movement thereto, respectively.

11. A shearing mechanism for a glass feeder comprising a vertically disposed yoke, a support for the yoke carried by the floor of an associated forehearth and about which the yoke may pivot on a vertical axis, a laterally projecting shear assembly carried by the yoke and means for swinging the yoke and the shear assembly about said axis, said means comprising a lever, means for supporting the lever with one of its ends engaging the yoke at a point offset from the axis of the support, and means for swinging the lever, said lever supporting means being movable to disengage said end of the lever from the yoke to permit free swinging movement of the yoke relative to the lever.

THOMAS FINNEY PEARSON.